(12) United States Patent
Aho et al.

(10) Patent No.: US 7,616,301 B2
(45) Date of Patent: Nov. 10, 2009

(54) DISC CLAMPING DEVICE FOR MULTIPLE STANDARD DISCS

(75) Inventors: Marc Aho, Aptos, CA (US); Daniel Tran, San Jose, CA (US)

(73) Assignee: n&k Technology, Inc., San Jose, CA (US)

(*) Notice: Subject to any disclaimer, the term of this patent is extended or adjusted under 35 U.S.C. 154(b) by 1189 days.

(21) Appl. No.: 10/792,655

(22) Filed: Mar. 3, 2004

(65) Prior Publication Data

US 2006/0017915 A1  Jan. 26, 2006

(51) Int. Cl.
*G01N 21/01* (2006.01)

(52) U.S. Cl. ............... 356/244; 269/58; 369/270.1

(58) Field of Classification Search ............ 356/244, 356/36, 426; 269/21, 55, 58, 234; 279/3; 369/270.1; 254/104
See application file for complete search history.

(56) References Cited

U.S. PATENT DOCUMENTS

| | | | | |
|---|---|---|---|---|
| 2,270,657 A * | 1/1942 | Kraft | ............ | 73/484 |
| 3,774,352 A * | 11/1973 | Weber | ............ | 451/406 |
| 3,978,767 A | 9/1976 | Levin | ............ | 409/164 |
| 4,541,717 A | 9/1985 | Itamoto et al. | ............ | 356/244 |
| 5,296,916 A | 3/1994 | Kelly et al. | ............ | 356/401 |
| 5,315,749 A | 5/1994 | Nenadic et al. | ............ | 29/559 |
| 5,316,276 A * | 5/1994 | Heinle | ............ | 269/21 |
| 5,429,045 A | 7/1995 | Karlyn et al. | ............ | 101/35 |
| 5,722,639 A * | 3/1998 | Nonaka | ............ | 254/104 |
| 5,986,753 A | 11/1999 | Seelig et al. | ............ | 356/244 |
| 6,042,097 A * | 3/2000 | Ikawa et al. | ............ | 269/71 |
| 6,084,666 A * | 7/2000 | Kindwall et al. | ............ | 356/244 |
| 6,164,633 A | 12/2000 | Mulligan et al. | ............ | 269/21 |
| 6,188,485 B1 | 2/2001 | Stumpe | ............ | 356/511 |
| 6,402,843 B1 | 6/2002 | Siniaguine et al. | ............ | 118/500 |
| 6,427,991 B1 | 8/2002 | Kao | ............ | 269/21 |
| 6,513,796 B2 | 2/2003 | Leidy et al. | ............ | 269/21 |
| 6,538,733 B2 | 3/2003 | Gaal et al. | ............ | 356/244 |
| 6,540,014 B2 | 4/2003 | Getchel et al. | ............ | 165/80.1 |
| 6,634,650 B2 | 10/2003 | Lerner | ............ | 279/3 |
| 6,655,672 B2 * | 12/2003 | Tsuruta | ............ | 269/21 |
| 6,669,540 B2 | 12/2003 | Gripp et al. | ............ | 451/288 |
| 7,169,360 B2 * | 1/2007 | Ågren et al. | ............ | 422/72 |

* cited by examiner

*Primary Examiner*—Gregory J Toatley, Jr.
*Assistant Examiner*—Michael Lapage
(74) *Attorney, Agent, or Firm*—Lumen Patent Firm

(57) ABSTRACT

A vacuum assisted disc clamping device provides a number of fixture rings preferably concentrically stacked on a fixture body that is moveable in fixture ring stacking direction and actuated by a wedge drive to compensate for varying fixture levels associated with the individual fixture rings and disc standards. Each fixture ring includes a planar flange with a vacuum groove and a central conical portion that rises above the planar flange. The conical portion is defined with a diameter and cone angle such that a disc of corresponding dimensional standard may be readily placed on the fitting fixture ring with the disc bottom being sucked onto the planar flange while the disc hole centers on the conical portion.

19 Claims, 4 Drawing Sheets

__DISC CLAMPING DEVICE FOR MULTIPLE STANDARD DISCS__

FIELD OF INVENTION

The present invention relates to disc chucks. Particularly, the present invention relates to disc clamping devices adapted for centrally holding discs of varying disc standards.

BACKGROUND OF INVENTION

In the field of information technologies disc like structures are utilized in data storage applications, in which the discs are fixed at a central hole and spun to read and/or write information on one or both of its top and bottom planar surfaces. Such discs are fabricated in ever increasing dimensional standards. For example, at the time the present invention was made there exist in the field of hard disc drives dimensional standards ranging at least between 25.4 and 130 mm for the outer diameter, with central hole diameters of at least between 7 and 40 mm and disc thicknesses between at least 0.381 and 1.9 mm. During disc fabrication and inspection, the discs need to be repeatedly precisely positioned and fixed. For example in an optical measurement apparatus such as a well known spectrometer, fixtures need to be available to accommodate for the widely spanning dimensional ranges of the discs to be inspected. In the prior art, replaceable chucks are commonly mounted prior to fixing a disc of corresponding standard.

In fabrication or inspection environments where a number of different disc standards are fabricated simultaneously, exchanging the chuck prior to disc fixture may impose significant delay in the fabrication or inspection process. At the same time as disc standards increase, fabrication equipment is demanded that is more flexible and efficiently operated eliminating repetitive tasks as much as possible. Therefore, there exists a need for a disc chuck, capable of fixedly holding discs of varying dimensional standards. The present invention addresses this need.

SUMMARY OF INVENTION

A vacuum assisted disc clamping device provides a number of fixture rings preferably concentrically stacked on a fixture body that is combined with an actuation mechanism driving the fixture body in ring stacking direction to compensate for varying fixture levels associated with the individual fixture rings and disc standards. Each fixture ring includes a planar flange with a vacuum groove and a central conical portion that rises above the planar flange. The conical portion is defined with a diameter and cone angle such that a disc of corresponding dimensional standard may be readily placed on the fitting fixture ring with the disc bottom being sucked onto the planar flange while the discs hole centers on the conical portion. The actuation mechanism lifts the disc via the fixture body and the fixture ring such that the disc's top is within a reference level regardless of the disc's height and the associated one of the stacked fixture rings. The actuation mechanism preferably includes a linear actuator actuating a driving wedge that pushes against a corresponding actuation face of the precision guided fixture body.

In an alternate embodiment of the invention, vacuum may be provided by a selection valve that is integrated in the fixture body and concurrently switched by the fixture body's adjustment movement.

DETAILED DESCRIPTION

Figure 1:
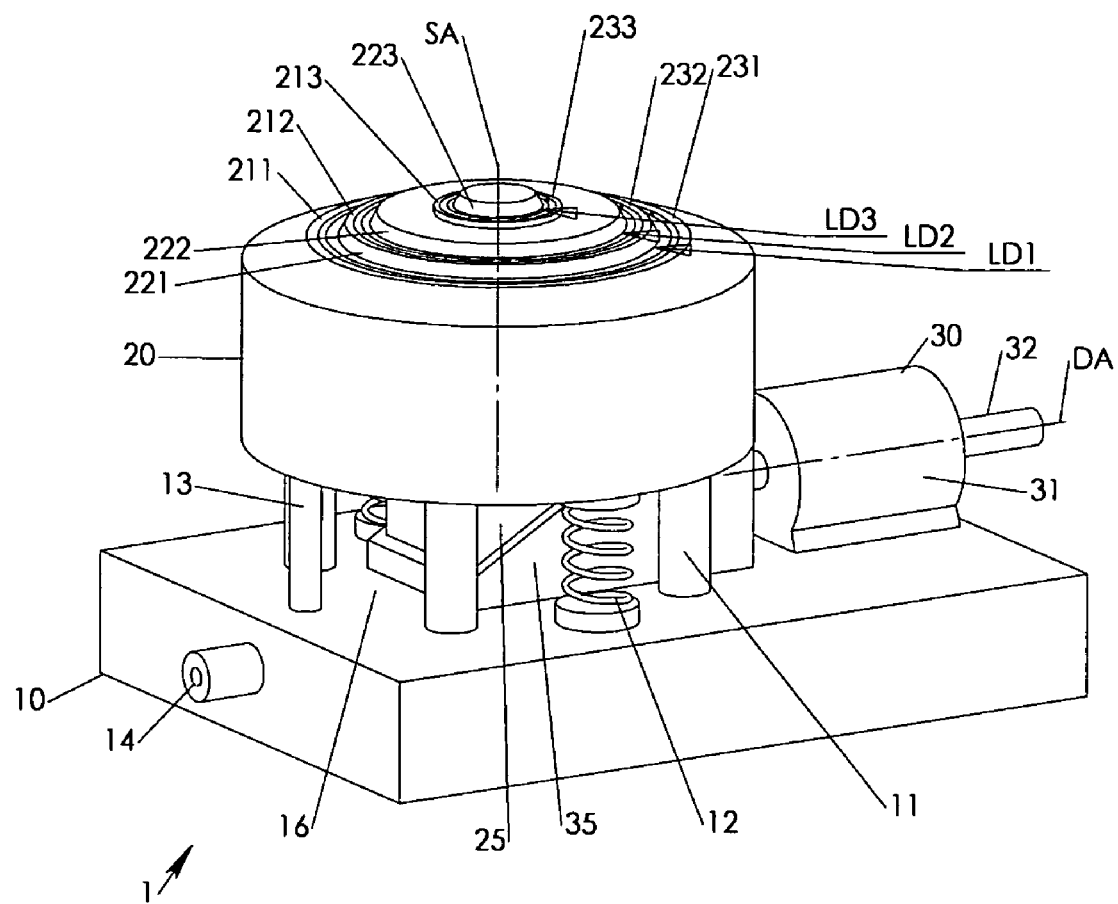
FIG. 1 is a perspective view of an exemplary simplified clamping device.
Figure 2:
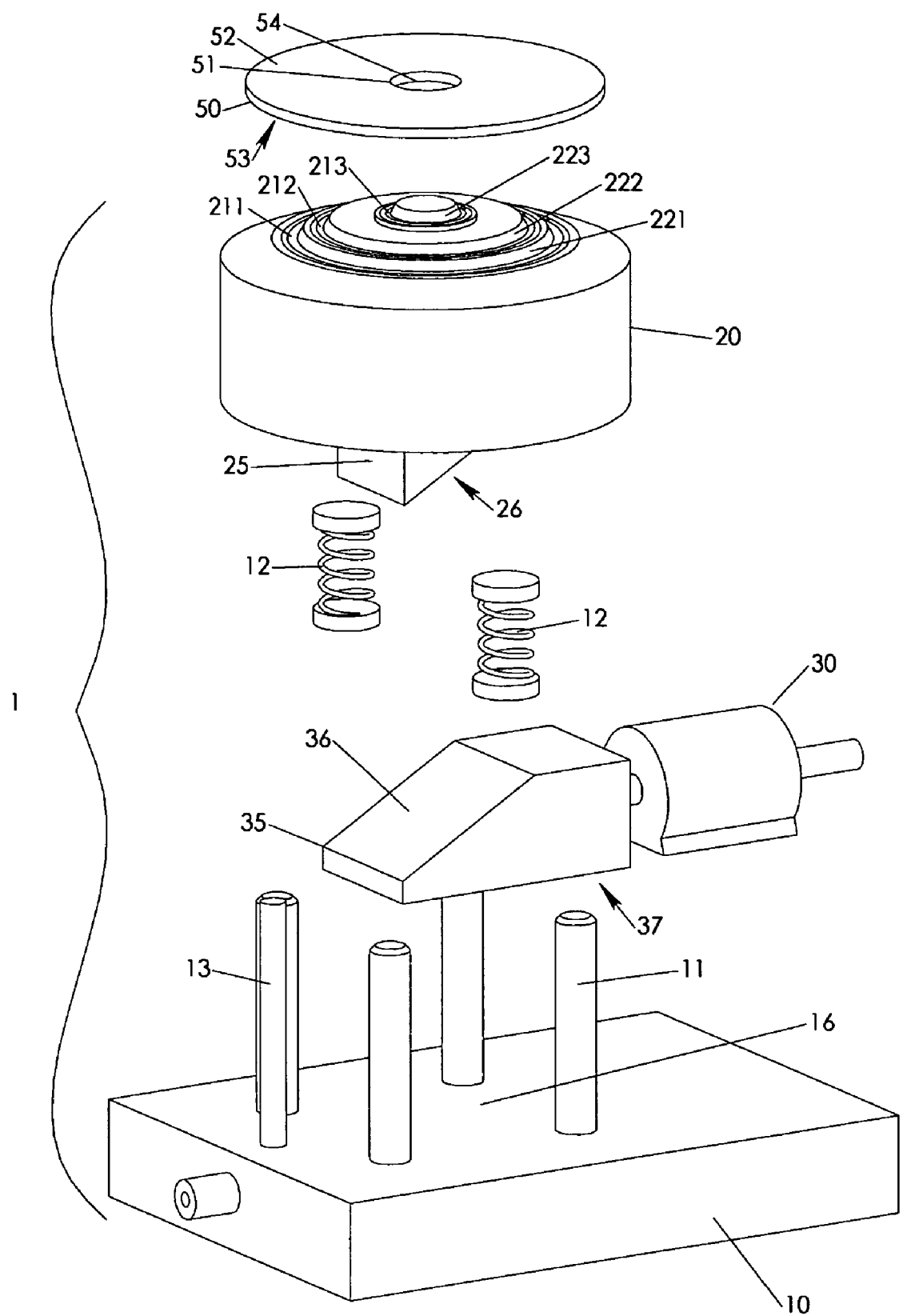
FIG. 2 is a perspective exploded view of the clamping device of FIG. 1.
Figure 3:
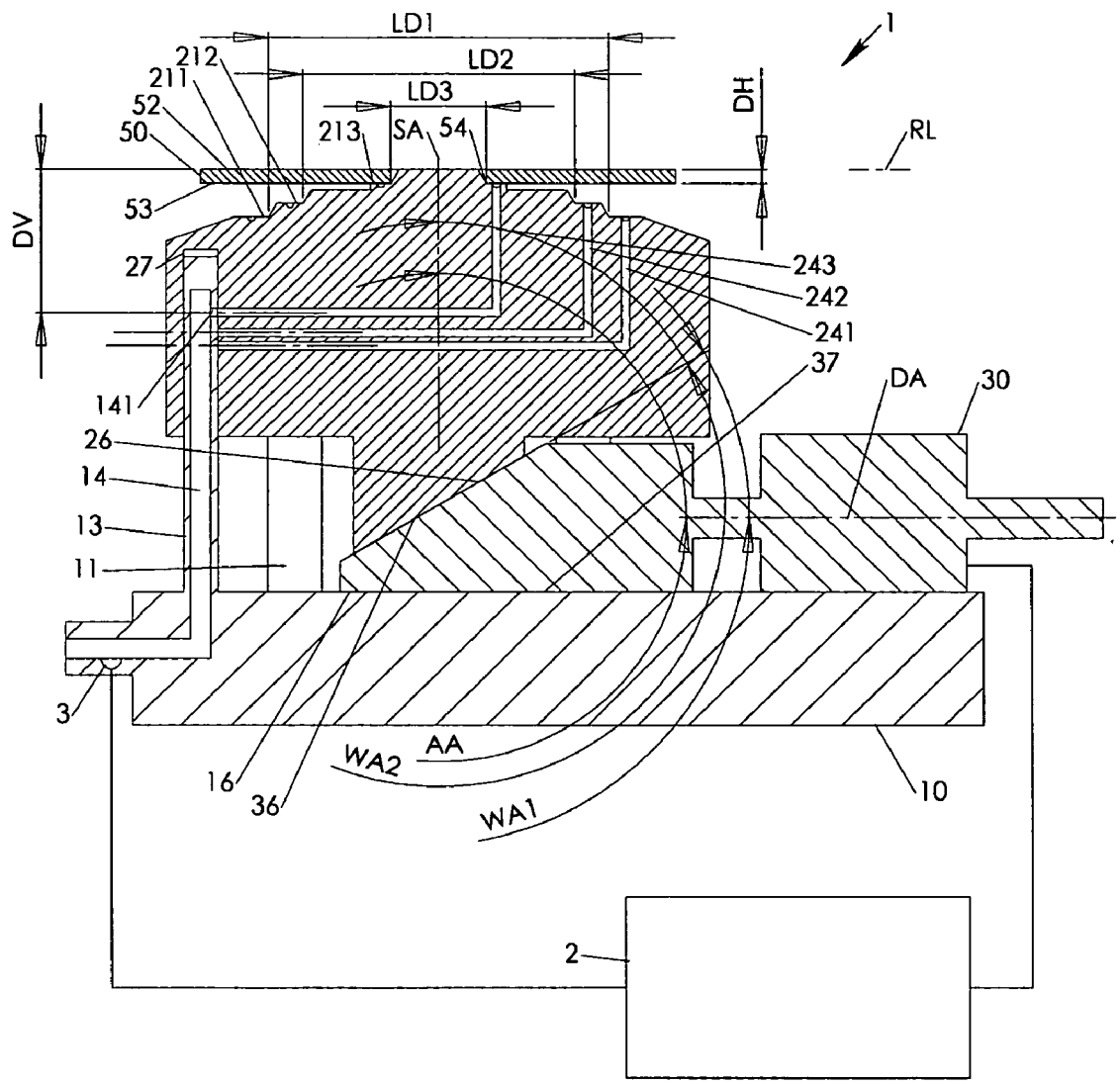
FIG. 3 is a frontal cut view of the clamping device of FIG. 1.

According to FIGS. 1-3, a disc clamping device 1 includes a base 10, a fixture body 20 and an actuation mechanism 30. The fixture body 20 is guided movable along a stacking axis SA. The fixture body 20 has two or more fixture rings accessible from the top. At least one of the fixture rings has a planar flange 211/212/213 and a centering cone 221/222/223. Each centering cone 221/222/223 has a distinct lateral dimension LD1/LD2/LD3 along an interference contour between the planar flanges 211/212/213 and their respective centering cone 221/222/223. In case, the planar flanges 211/212/213 are inward extending up to their respective centering cone 221/222/223, the interference contour may in fact be an interference edge. For ease of fabrication, the planar flanges 211/212/213 may terminate in a slight offset from their respective centering cone 221/222/223 with a small recess in between, such that the centering cone 221/222/223 may extend slightly below their respective planar flanges 211/212/213.

The fixture rings are positioned on the fixture body 20 along the stacking axis SA such that the one fixture ring with the least lateral dimension LD3 is on top of one other of the fixture rings having the next larger lateral dimension LD2. The fixture body further includes a rest face 26 for receiving a moving impulse. The fixture rings are preferably concentrically stacked on top of each other.

The base 10 has body guides 11 structurally communicating with the fixture body 20. The body guides 11 are preferably well known linear precision guides such as cylindrical columns in combination with ball bearing sleeves. The base 10 further features a base face 16 for opposing the moving impulse. The actuation mechanism 30 is configured for inducing the moving impulse in between the rest face 26 and the base face 16.

At least one of the planar flanges 211/212/213 further includes an externally accessible vacuum groove 231/232/233. As illustrated in FIG. 3, the vacuum grooves 231/232/233 may communicate via respective groove access channels 241/242/243 at a number of predetermined positions alternating with a valve opening 141, which extends into a vacuum connect 13 of base 10. The vacuum connect 13 may be sealed and sliding in direction of the stacking axis SA within a sealing guide 27 of the fixture body 20 such that a movement of the fixture body 20 along the stacking axis SA results in a relative motion of the groove access channels 241/242/243 with respect to the valve opening 141.

As shown by example in FIG. 3, the centering cone 223 may comply to a center hole 51 of a disc 50 of a particular dimensional disc standard such that a hole bottom edge 54 may snugly contact the centering cone 223 when the disc 50 is placed on the fixture body 20. Particularly, the lateral dimension LD3 is defined that the snug contact between the hole bottom edge 54 and the centering cone 223 occurs at or would occur slightly below planar flange 213 such that a snug contact between disc bottom 53 and planar flange 214 is warranted.

During placement of a disc 50 on its corresponding fixture ring, the snug contact of the disc bottom 53 with its corresponding planar flange 213 seals the vacuum groove 233 against ambient pressure and a downward force is induced by the ambient pressure on the disc 50 while the vacuum groove 233 is evacuated. The vacuum causing disc 50 acts consequently also as a valve, which may be utilized by a device control 2 in combination with a vacuum sensor 3 to derive information about which fixture ring is populated by a disc 50. This is explained in more detail further below.

The predetermined positions are selected with respect to a reference level RL and a disc height DH of the disc 50 of a particular dimensional disc standard to which one of the corresponding fixture rings is adapted. From the reference level RL and the disc height DH is the valve distance DV derived. The valve distance DV is constant for each fixture ring, its correspondingly dimensioned disc and corresponding reference level RL. As a result, vacuum is automatically and selectively applied to one of the vacuum grooves 231/232/233 the fixture ring of which is holding a disc with its top 52 at the reference level RL. In simplified embodiment of the invention, the groove access channels 241/242/243 may be independently supplied with vacuum without a valve mechanism as described above.

The actuation mechanism 30 is preferably a wedge drive actuating a wedge 35 along the drive axis DA preferably via a thread spindle 32 and a hollow shaft stepper motor 31. The drive axis DA is oriented in an actuation angle AA of preferably 90 degrees with respect to the preferable vertical stacking axis DA. The wedge 35 has a wedge face 36 pushing against the rest face 26 either in a snug contact or by means of a roller bearing. The wedge 35 has further a bottom face 37 pushing against the base face 16 either in a snug contact or by means of a roller bearing. The roller bearing(s) may be utilized in a well known fashion to reduce friction between the opposite faces 26, 36 and 16, 37. In a more general embodiment of the invention, the rest face 26 may be any well known low friction contacting feature. More specifically, the rest face 26 may be substituted by a roller in rolling contact with said wedge face 36.

The wedge face 36 is in a first wedge angle WA1 of preferably 30 degrees with respect to the drive axis DA. For the preferred 90 degree actuation angle AA, the second wedge angle WA2 of the rest face with respect to the stacking axis SA is 60 degrees. The transmission ratio between wedge 35 movement and fixture body 20 movement is a trigonometric tangent function of WA1 and WA2, which is for the exemplary angles of 30 and 60 degrees consequently 2:1. The transmission ratio may be well adjusted in accordance with the teachings above as may be appreciated by anyone skilled in the art.

As the wedge 35 is moved along the driving axis DA, it wedges in between the rest face 26 and the base face 16 causing a moving impulse onto the fixture body 20. The body guides 11 provide sufficient stiffness to oppose the wedge's 35 force along the driving axis DA. The use of the described actuation mechanism provides for a smooth and highly precise actuation of the fixture body 20. Position tolerance in direction of the stacking axis SA of about 0.012 mm with 0.005 mm repeatability with an overall movement range of about 7 mm of the fixture body 20 were achieved in an exemplary disc clamping device 1 providing fixture for discs 50 of following dimensional standards (outside diameter×hole diameter×thickness): 25.4×7×0.381 mm, 65×20×0.8 mm, and 85×25×0.8 mm. The footprint of that exemplary disc clamping device 1 was 110×180 mm with an overall height at maximum raised fixture body 20 of about 84 mm.

The disc clamping device 1 may further include a device control 2 controlling the actuation mechanism 30 by combining well known motion signals, which are processed in conjunction with predetermined parameters and a predetermined actuation algorithm to provide a driving current to the stepper motor 31. A vacuum sensor 3 may also be part of the disc clamping device 1. The vacuum sensor 3 may provide a signal to the device control 2 in response to a sensed vacuum in one of the vacuum grooves 231/232/233, the groove access channels 241/242/243 and the vacuum access 14. In FIG. 3, the vacuum sensor 3 is exemplarily illustrated as being placed in communication with the vacuum access 14.

The actuation algorithm may be executed by the device control 2 such that the actuation mechanism 30 is brought to a controlled halt in response to the vacuum sensor's 3 signal and such that the fixture body 20 is positioned along the stacking axis SA at a predetermined position where the top 51 of a vacuum causing disc 50 coincides with the reference level RL. In that fashion, the placement of a disc 50 at any of the fixture rings seals one of the vacuum grooves 231/232/233 and the device control 2 may recognize the populated fixture ring by correlating a sensed vacuum to an associated position of the fixture body 20 along the stacking axis SA. The associated position of the fixture body 20 may be recognized by the device control 2 via a position signal or other position information of the actuation mechanism 30 as may be well appreciated by anyone skilled in the art. After recognizing the populated fixture ring, the device control 2 may fine adjust the fixture body 20 such that the disc top 52 may coincide with the reference level RL.

The disc clamping device 1 may further include tension springs 12 hinged between the fixture body 20 and the base 10. The tension springs 12 force the fixture body towards the base 10 and warrant contact between the faces 26, 36 and 16, 37. The tension springs 12 are preferably symmetrically placed with respect to the actuation mechanism 30 for an even force distribution onto the faces 16,26,36,37.

Figure 4:
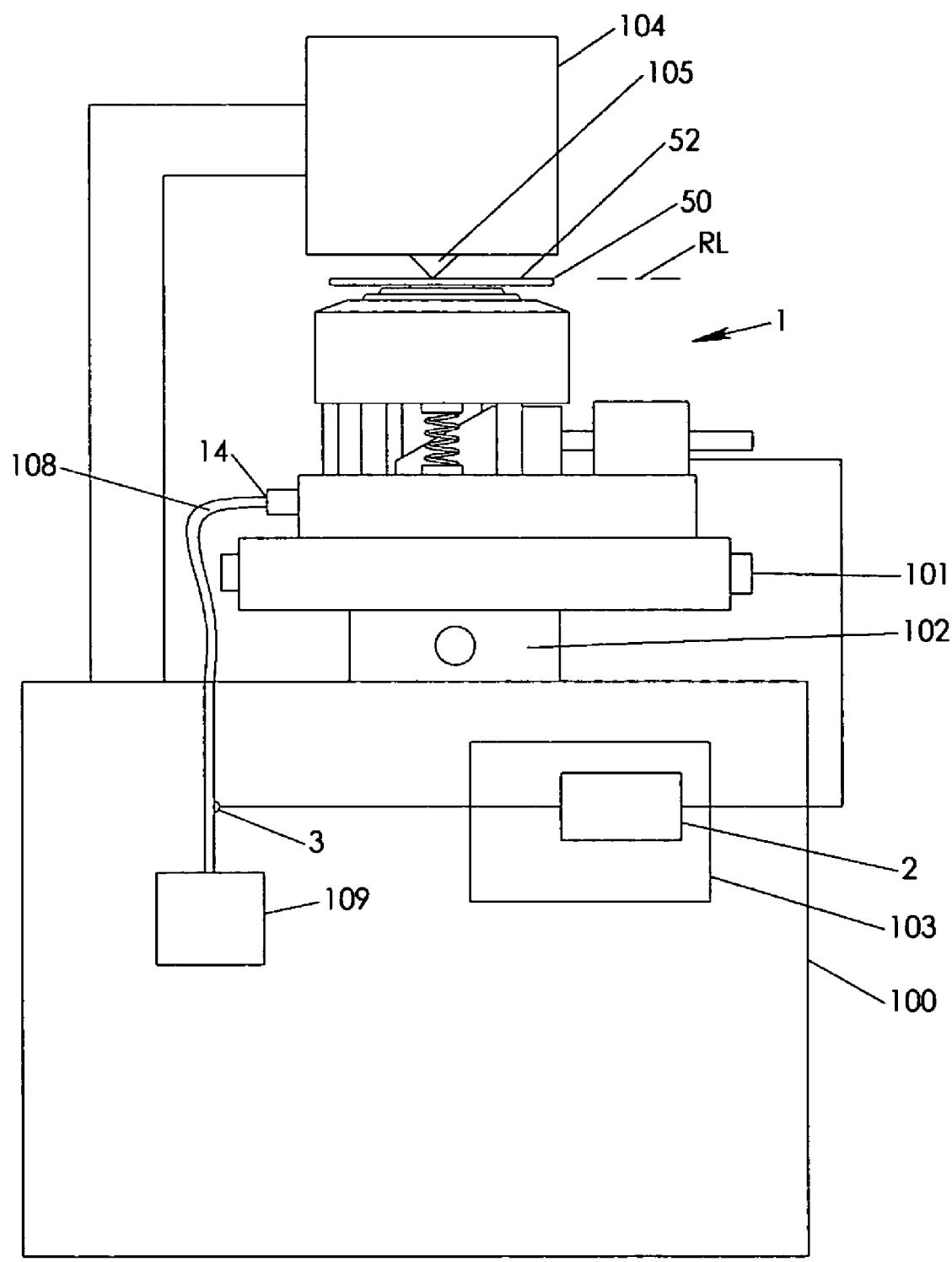
FIG. 4 illustrates an optical measurement apparatus including the clamping device of FIG. 1.

The disc clamping device 1 may be integral part of a linear stage and/or integral part of a rotary stage. Moreover, the disc clamping device 1 may be part of an inspection apparatus 100 as illustrated in FIG. 4. Such inspection apparatus 100 may be a well known spectrometer having an inspection head 104 where an inspection beam 105 emerges from and focuses at the reference level RL. The disc clamping device 1 may be mounted on or integral part of a linear X stage 101 and/or and linear Y stage 102. The highly compact disc clamping device 1 may in that fashion be moved with a disc 50 beneath the focused inspection beam 105. The small footprint of the disc clamping device 1 requires minimal additional space and contributes to a minimal overall space requirement of the disc inspection apparatus 100. The vacuum access 14 may be connected to a vacuum supply 109 via a vacuum line 108. The device control 2 may be part of an apparatus control 103.

Accordingly, the scope of the invention described in the specification above is set forth by the following claims and their legal equivalent:

What is claimed is:
1. A multiple standards disc clamping device comprising:
 a. a fixture body guided moveable along a stacking axis, said fixture body having:
  I. two or more fixture rings accessible from top, each of said fixture rings having a planar flange and a centering cone with distinct lateral dimension, said fixture rings being positioned along said stacking axis such that one of said two or more fixture rings having a least distinct lateral dimension being on top of one other of said two or more fixture rings having a next larger lateral dimension;
II. a contacting feature for receiving a moving impulse;
b. a base having:
I. body guides structurally communicating with said fixture body and guiding said fixture body along said stacking axis;
II. a base face for opposing said moving impulse; and
c. an actuation means inducing said moving impulse in between said contacting feature and said base face;
wherein at least one of said planar flanges further comprises an externally accessible vacuum groove;
wherein at a predetermined position of said fixture body along said stacking axis said vacuum groove communicates via a groove access channel with a valve means of said base.

2. The disc clamping device of claim 1, wherein said actuation means is a wedge drive actuating a wedge along a drive axis being in an actuation angle with respect to said stacking axis and wherein said wedge has a wedge face pushing against said contacting feature and a bottom face pushing against said base face.

3. The disc clamping device of claim 2, wherein said contacting feature is a roller in a rolling contact with said wedge face.

4. The disc clamping device of claim 2, wherein said contacting feature is a rest face parallel to and in snug contact with said wedge face.

5. The disc clamping device of claim 1, further comprising a device control controlling said actuation means.

6. The disc clamping device of claim 5, further comprising a vacuum sensor providing a signal to said device control in response to a sensed vacuum in one of said vacuum groove, said groove access channel and a vacuum access.

7. The disc clamping device of claim 6, further comprising an actuation algorithm executed by said device control such that one of said fixture rings being populated by a disc and having said vacuum groove of it sealed is recognized by said device control in response to said signal and in response to an associated position of said fixture body recognized by said device control via a position information of said actuation means.

8. The disc clamping device of claim 1 being an integral part of a linear stage.

9. The disc clamping device of claim 1 being an integral part of a rotary stage.

10. A disc inspection apparatus comprising a multiple standards disc clamping device having:
a. a fixture body guided moveable along a stacking axis, said fixture body having:
I. two or more fixture rings accessible from top, each of said fixture rings having a planar flange and a centering cone with distinct lateral dimension, said fixture rings being positioned along said stacking axis such that one of said two or more fixture rings having a least distinct lateral dimension being on top of one other of said two or more fixture rings having a next larger lateral dimension;
II. a contacting feature for receiving a moving impulse;
b. a base having:
I. body guides structurally communicating with said fixture body and guiding said fixture body along said stacking axis;
II. a base face for opposing said moving impulse; and
c. an actuation means inducing said moving impulse in between said rest face and said base face;
wherein at least one of said planar flanges further comprises an externally accessible vacuum groove;
wherein at a predetermined position of said fixture body along said stacking axis said vacuum groove communicates via a groove access channel with a valve means of said base.

11. The disc inspection apparatus of claim 10, wherein said actuation means is a wedge drive actuating a wedge along a drive axis which is in an actuation angle with respect to said stacking axis and wherein said wedge has a wedge face pushing against said contacting feature and a bottom face pushing against said base face.

12. The disc inspection apparatus of claim 11, wherein said contacting feature is a roller in a rolling contact with said wedge face.

13. The disc inspection apparatus of claim 11, wherein said contacting feature is a rest face parallel to and in snug contact with said wedge face.

14. The disc inspection apparatus of claim 10, further comprising a device control controlling said actuation means.

15. The disc inspection apparatus of claim 14, further comprising a vacuum sensor providing a signal to said device control in response to a sensed vacuum condition in one of said vacuum groove, said groove access channel and a vacuum access.

16. The disc inspection apparatus of claim 15, further comprising an actuation algorithm executed by said device control such that one of said fixture rings being populated by a disc and having said vacuum groove of it sealed is recognized by said device control in response to said signal and in response to an associated position of said fixture body recognized by said device control via a position information of said actuation means.

17. The disc inspection apparatus of claim 14, wherein said device control is an integral part of an apparatus control controlling said inspection apparatus.

18. The disc inspection apparatus of claim 10 further comprising a linear stage, wherein said disc clamping device is an integral part of said linear stage.

19. The disc inspection apparatus of claim 10 further comprising a rotary stage, wherein said disc clamping device is an integral part of said rotary stage.

* * * * *